(12) United States Patent
Olson

(10) Patent No.: US 9,094,567 B2
(45) Date of Patent: Jul. 28, 2015

(54) MULTI-CHANNEL CAMERA SYSTEM

(71) Applicant: James Olson, Canandiagua, NY (US)

(72) Inventor: James Olson, Canandiagua, NY (US)

( * ) Notice: Subject to any disclaimer, the term of this patent is extended or adjusted under 35 U.S.C. 154(b) by 0 days.

(21) Appl. No.: 14/212,272

(22) Filed: Mar. 14, 2014

(65) Prior Publication Data

US 2014/0320707 A1 Oct. 30, 2014

Related U.S. Application Data

(60) Provisional application No. 61/783,966, filed on Mar. 14, 2013.

(51) Int. Cl.
| | |
|---|---|
| H04N 9/097 | (2006.01) |
| H04N 5/225 | (2006.01) |
| H04N 5/235 | (2006.01) |
| H04N 5/33 | (2006.01) |
| H04N 9/04 | (2006.01) |

(52) U.S. Cl.
CPC .............. *H04N 9/097* (2013.01); *H04N 5/2258* (2013.01); *H04N 5/235* (2013.01); *H04N 5/332* (2013.01); *H04N 9/045* (2013.01)

(58) Field of Classification Search
CPC .......... H04N 5/2258; H04N 2209/048; H04N 9/045; H04N 9/09; H04N 9/097; H04N 13/025
See application file for complete search history.

(56) References Cited

U.S. PATENT DOCUMENTS

| | | | |
|---|---|---|---|
| 4,107,732 A | 8/1978 | Adcock et al. | |
| 4,644,390 A | 2/1987 | Ochi | |
| 4,823,186 A | 4/1989 | Muramatsu | |
| 5,167,350 A | 12/1992 | Amberg et al. | |
| 5,978,023 A | 11/1999 | Glenn | |
| 6,515,275 B1 | 2/2003 | Hunter et al. | |
| 6,801,719 B1 | 10/2004 | Szajewski et al. | |
| 7,057,654 B2 | 6/2006 | Roddy et al. | |
| 7,095,443 B2 * | 8/2006 | Yoshikawa | 348/350 |
| 7,567,271 B2 * | 7/2009 | Berestov | 348/48 |
| 7,667,662 B2 | 2/2010 | Chiang | |
| 7,868,936 B2 * | 1/2011 | Ajito et al. | 348/271 |
| 8,670,024 B2 * | 3/2014 | Steurer | 348/49 |
| 2003/0048493 A1 | 3/2003 | Pontifex et al. | |
| 2003/0160881 A1 * | 8/2003 | Roddy et al. | 348/272 |
| 2007/0081086 A1 | 4/2007 | Ingram | |
| 2010/0315511 A1 | 12/2010 | Tsao et al. | |
| 2011/0074931 A1 | 3/2011 | Bilbrey et al. | |

* cited by examiner

*Primary Examiner* — Nicholas Giles

(57) ABSTRACT

A camera system to capture a visual image comprising of a housing that allowing a beam of light representing the visual image to be captured to enter the housing. The camera system has a dichroic beam splitter placed in the path of the beam of light to split the beam of light into a two beams of light. The first beam of light is comprised of red light and blue light while the second beam is comprised of green light and near infrared light. The camera system has two filters that will filter the two beams of light. The first filter is comprised of an array of a first and second filter elements. The first filter element allows red light to pass through it while the second filter element allows blue light to pass through it. The second filter has an array of two filter elements as well. The first and second filter elements in the second filter will allow green and near infrared light to pass through it. The amount of filtered light for each of the spectral bands is roughly equal to each other. The filtered light from each filter will be intercepted by two image sensors that will measure the intensities of the red, blue, green and near infrared lights. Graphical displays and/or other calculations based on the measured intensities are displayed to the user.

20 Claims, 8 Drawing Sheets

Outputs (Raw)    Outputs (Interpolated)

MULTI-CHANNEL CAMERA SYSTEM

CROSS-REFERENCE TO RELATED APPLICATIONS

This application relates to and claims priority rights from provisional application U.S. 61/783,966 filed on Mar. 14, 2013, the entire disclosures of which are hereby incorporated by reference herein.

BACKGROUND OF THE INVENTION

1. Field of the Invention

This invention relates to a multi-channel compact camera system.

2. Description of the Related Art

Cameras are well known devices for capturing a visual image. With the advent of electronic image sensors, digital cameras started using image sensors such as a CCD image sensor or a CMOS image sensor. The use of an image sensor easily allowed the camera to store the captured image as digital information. The digital information could be analyzed separately or could be used to reproduce the visual image.

As the typical camera is used to capture a visual image as seen by the human eye, digital cameras were designed with that purpose in mind. Most cameras capture the spectrum of light that correspond to visible light, approximately 450 to 700 nm. In particular, these cameras capture three spectral bands, (1) red light, (2) green light, and (3) blue light. If light from these three spectrums are captured and reproduced, the resulting image would closely mimic the image as seen by the human eye.

To make digital cameras capture color, they are made to absorb light in a way that's similar to the way our eyes do. That is, they contain arrays of photosites that sense red, green, or blue light. Traditionally this is done in one of two ways: 1) Using a single image sensor which incorporates a Color Filter Array (CFA); or 2) Using a three image sensor configuration with a multiple channel beam splitting component that separates images into discrete red, green and blue channels using conventional filters. Using a single image sensor which incorporates a CFA will generally have poorer resolution than multiple image sensors. However, a multiple image sensor configuration will increase the size and cost of the camera. It would be advantageous to have a camera system that maximizes the compactness of the device while maintaining the quality of data to suffice for the purposes of the camera.

It is known that the human eye is most sensitive to green light. In addition, the human eye's perception of resolution peaks in the green portion of the spectrum and is much more sensitive to brightness (luminance) variations than to color (chrominance) variations. To mimic this property of the eye, digital cameras will employ CFAs that will allow more green light to filter through the CFA than red and blue. One such popular CFA (RGGB filter), will allow twice as much green light to filter through than red light or blue light. This results in twice as much resolution from the green channel of a typical single-chip camera, than from either red or blue one. This chroma subsampling (G:B:R sampling ratios of 2:1:1) is the practice of encoding images by implementing less resolution for chroma information than for luma information, taking advantage of the human visual system's lower acuity for color differences than for luminance.

CCD and CMOS image sensors are sensitive to light outside of the visible spectrum, specifically the near infrared ("NIR") portion of the spectrum (approximately 700 to 900 nm). Because of this sensitivity, color RGB cameras employ NIR blocking filters to eliminate color cross-talk or color distortion in the RGB Image.

The NIR portion of the spectrum does, however, have significant information content. Some specialized RGB camera replace the NIR blocking filter with a blue blocking filter to create a Green-Red-Near IR (GRN) image capture or Color-IR image capture device. Because the blue CFA material transmits both blue and NIR light, this filter change results in collecting NIR light in pixels originally purposed to collect blue light. In this configuration the camera captures three spectral bands with a G:R:N sampling ratio of 2:1:1 and when the bands are combined they generate useful false color images for assessment of information content.

Each individual spectral band, however, has significant image information content of its own. Also, ratios of individual bands can be used to extract additional information content not easily obtained from individual bands. Unfortunately, the low sampling ratios of the B, R and N bands in conventional camera configurations result in low resolution band content and the ability to assess information content from these bands is diminished.

Current color cameras are extremely wasteful with light. To capture color images, a filter or series of filters needs to be placed over each pixel of an image sensor that permits only particular colors of light. Due to subsampling of a RGGB pattern only 50% of incoming green light and 25% of red and blue light is available to be captured. Furthermore, because of the attenuation of the red, green and blue filters only half of that available light can reach the light sensing elements of the sensor. The net result is that roughly 25% of all green light and 12.5% of all red and blue light actually reach the light sensing portion of the sensor.

It would be advantageous to have a camera system that maximizes the compactness of the device while capturing four simultaneous spectral bands (red, blue, green and NIR) with minimal spectral crosstalk while maximizing the quality of data (sampling density and light transmission) and, if desired, maintain a R:G:B:N sampling ratio of 1:1:1:1 to suffice for the purposes of maximum image information content assessment from the camera.

SUMMARY OF THE INVENTION

The above objects of the invention and advantages are achieved by having a compact camera that uses a dichroic beam splitter, multiple CFAs coupled with multiple image sensors. The dichroic beam splitter will separate the incoming light into two independent beams each containing two spectral bands. The CFA in each beam will then separate the spectral bands which are subsequently passed through to the light sensing elements of the image sensors. The four spectral bands are (1) red, (2) blue, (3) green and (4) NIR. The CFAs will allow uniform sampling of each spectral band by allowing equal amounts of each bandwidth to filter through to the sensors.

The proposed invention can maintain 50% sampling density over all spectral image content (Four unique color planes: Red, Green, Blue and NIR). A unique quality of the proposed invention is the ability to maintain uniformity over all spectral bands (a 1:1:1:1 ratio of R:G:B:N) while maintaining high sampling density and high light transmission for each band.

The proposed invention not only adds an additional spectral band to the typical image capture process, it uses a dichroic filters with efficiencies approaching 100% combined with CMY (Cyan, Magenta, and Yellow) pixel filter material with transmission typically 80%. Accounting for the uniform 50% sampling in each spectral band, the net delivery of light to the light sensing portion of the sensor is roughly 40% (R,G,B,NIR) vs. the 25% G, 12.5% R and 12.5% B of typical color cameras.

A second embodiment of the present invention involves inclusion of short wave infrared (SWIR) spectral bands labeled SW1 and SW2 to the four band Visible+NIR image capture described above. The sampling ratio between the SWIR bands and the visible+NIR bands can be made to remain at 1:1 ratio.

DETAILED DESCRIPTION OF THE EMBODIMENTS

Figure 1:
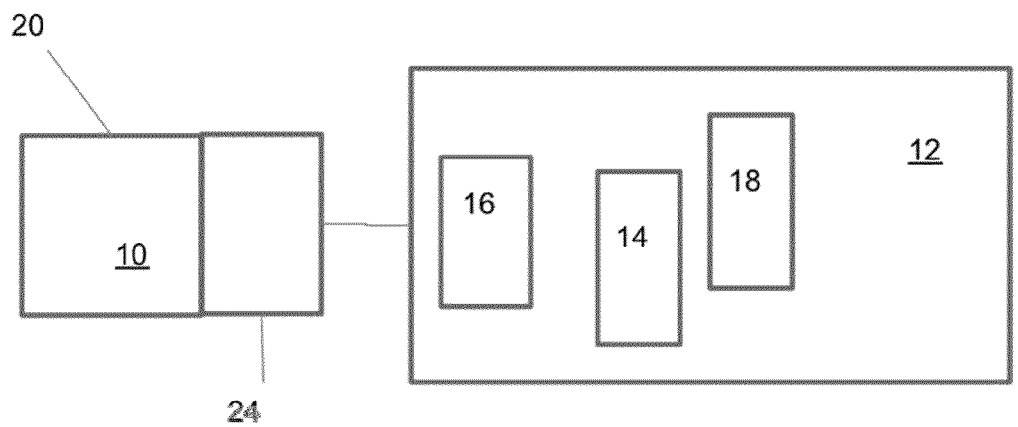
FIG. 1 depicts a plan view of the components of the overall system in accordance with one embodiment of the present invention.

For the purposes of understanding the invention, reference will now be made to the embodiments illustrated in the drawings. It will be understood that no limitation of the scope of the invention is thereby intended. Any alterations and further modifications in the described embodiments, and any further applications of the principles of the invention as described herein are contemplated as would normally occur to one skilled in the art to which the invention relates.

Referring to FIG. 1, one embodiment of the camera system is shown. Camera unit 10 is shown electrically connected to computer unit 12. Computer unit 12 can have a processor 14 and memory 16. Processor 16 will be capable of running application software to handle and manipulate data output from camera unit 10. Processor 16 will be capable of storing data in memory 16.

Computer unit 12 will also have a display device 18 that is capable of displaying the output data from camera unit. Display device 18 can be capable of showing visual graphics. Computer unit 12 will also have a user interface to allow a user to interact with the invented system. Such user interface can include separate devices (such as a keyboard) or graphical user interfaces depicted on the display device. A variety of different display devices, data storage mediums or user interfaces can be used and still be within the scope of the present invention.

Camera unit 10 will have two separate sections: (1) lens section 20 and (2) image sensor section 24. Lens section contains the lenses that will focus the incoming light into the image sensor section 24. The lens section may contain a shutter and/or iris that control the amount of light that is exposed to the image sensor section 24 if the CCD or CMOS sensor requires external shutter and/or exposure control. All of the components depicted in FIG. 1 can be physically located in the same housing or be located in separate housings that are physically attachable to each other.

Figure 2:
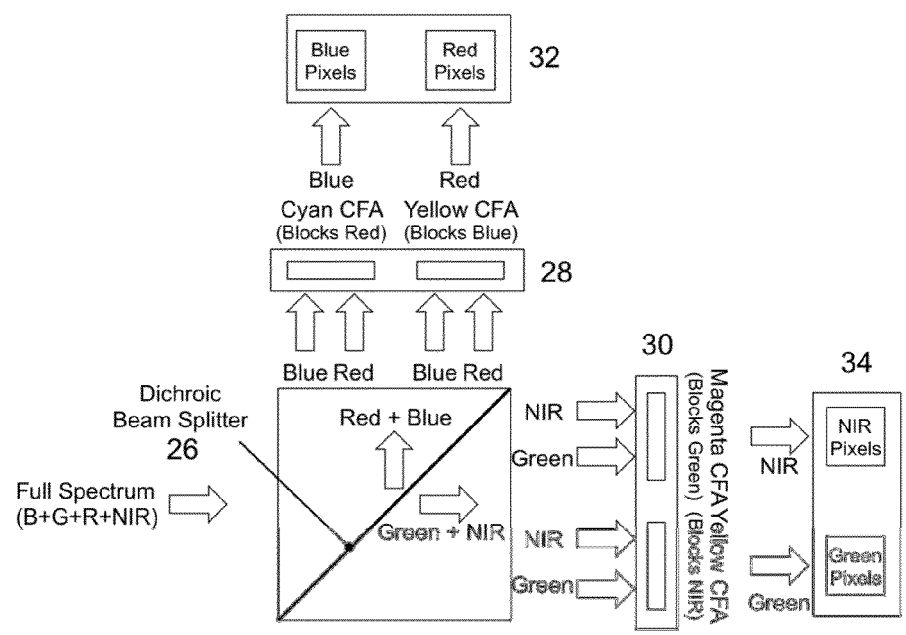
FIG. 2 depicts a plan view of the components of the camera component in accordance with one embodiment of the present invention.

FIG. 2 depicts the components of the sensor section 24. Sensor section comprises of the following components: dichroic beam splitter 26, two composite CFAs 28 and 30 and two image sensors 32 and 34. The dichroic beam splitter will separate the light into two sets of pairs of spectral bands, red and blue light in one band with green and near infrared (NIR) light in the other. Other pairs of spectral bands can be used and still be in the scope of the present invention. Dichroic filters have the unique properties of higher in-band transmission and out-of-band reflection as well as sharp spectral cut-offs giving imaging systems using these filters greater light sensitivity and higher color purity. Other beam splitters may be used and be within the scope of the present invention.

The dichroic beam splitter will separate the light into two sets of pairs of spectral bands, the angle at which the light is reflected is shown to be approximately 90 degrees, but any angle is possible as long as the two beams are physically separated. The present invention achieves many of its advantages by pairing green light with the NIR light and pairing the red light with the blue light. With these combinations, the spectral bands are far enough apart from each other within the spectral band pair that the splitting and filtering process maximizes the light transmission and capture by the sensor. This results in greater spectral purity. Moreover, splitting and combining these particular pairs, a single CFA filter layer can be used to filter the paired combination, which maximizes light transmission and increases light sensitivity.

Each spectral band pair is sent through its own respective composite CFA. In the embodiment shown in FIG. 2, the CFA will be a composite CFA containing two spectral band filters. For the CFA that receives the red and blue light, the CFA will contain cyan filter material and a yellow filter material. For the CFA that receives the green and NIR light, the CFA will contain yellow filter material and magenta filter material. The yellow filter material will filter out the blue and NIR spectral wavelengths. The cyan filter material will filter out red light and the magenta filter material will filter out green light. As a result, only blue light will pass through the cyan filter material and only red light will pass through the yellow filter material in the red/blue beam. Similarly, only green light will pass through the yellow filter material and NIR light will pass through the magenta filter material in the green/NIR beam.

Figure 3:
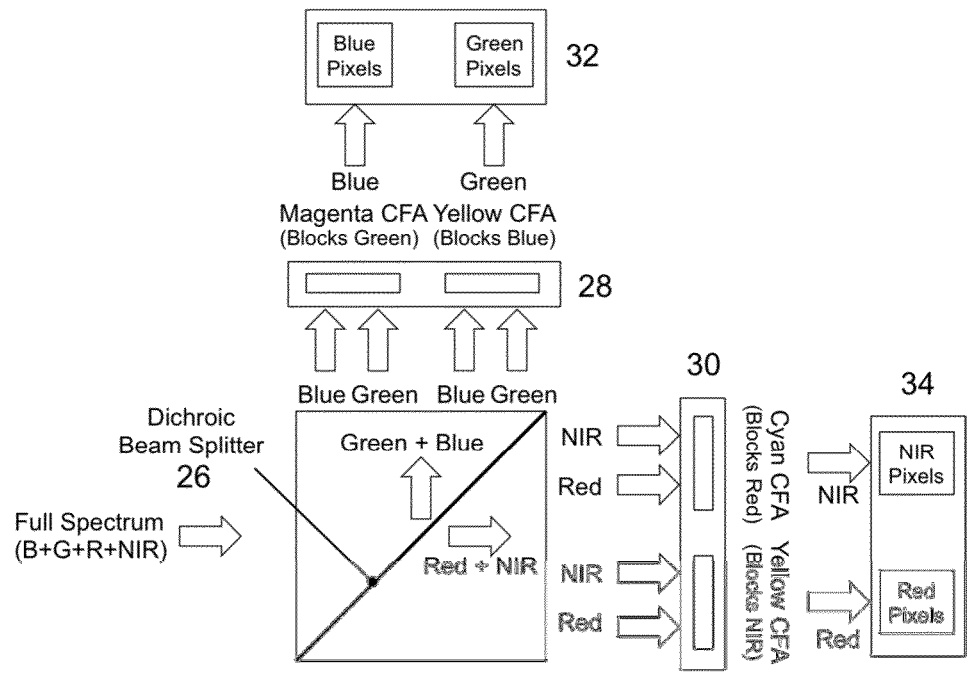
FIG. 3 depicts a plan view of the components of the camera component in accordance with another embodiment of the present invention.

An alternate embodiment is shown in FIG. 3 that uses different filter color combinations to accomplish the same spectral band separation described in the previous paragraph. Other filter color combinations are also possible and still fall within the scope of the present invention.

Referring back to FIG. 2, the CFAs shown are designed to created discrete color pixels according to the four spectral bandwidths. Blue, Green and Red pixels can be created by depositing combinations of Cyan, Magenta and Yellow CFA material at discrete photosites allowing each photosite to capture part of the color spectrum. One embodiment of the present invention utilizes highly efficient single layer CMY (Cyan, Magenta, and Yellow) pixel filter material with transmissions properties that are typically 80%. Other filter material may be used and be within the scope of the present invention.

Figure 4:
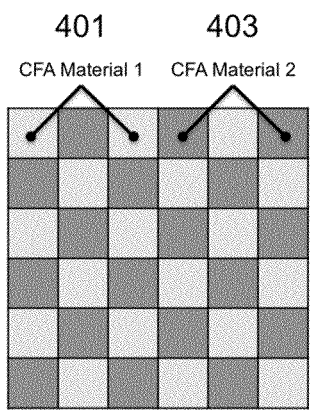
FIG. 4 depicts a view of the CFA pattern in accordance with one embodiment of the present invention.

FIG. 4 depicts one of the CFA configurations showing how the different colored CFA material is arranged in the composite CFA. As shown, a CFA is depicted with two different CFA materials, 401 and 403. The two different filter materials alternate with each other to comprise of a checkerboard pattern. Each checkerboard box roughly corresponds to a pixel and will allow the specific filtered light to be passed to the photosensitive elements of the image sensor chip. By having a checkered pattern to the different filter materials for each CFA, the invention ensures that the ratios of different colored pixels are roughly equal. The checkered pattern also allows for the missing color data in each spectral band data set to be easily interpolated from the surrounding pixels.

Figure 5:
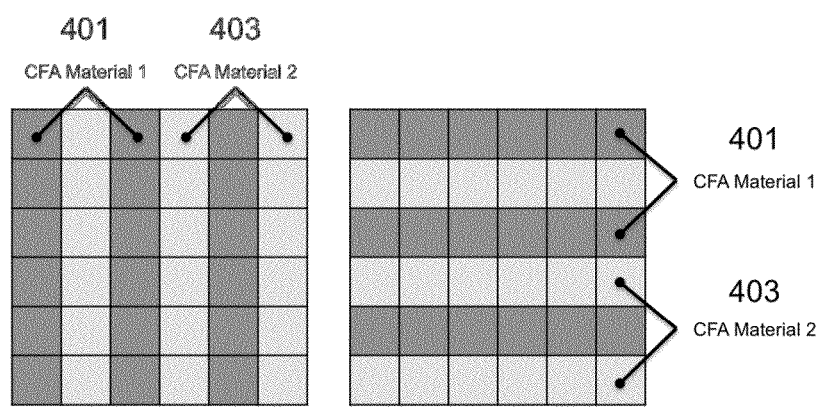
FIG. 5 depicts an alternate view of the CFA pattern in accordance with another embodiment of the present invention.

Other patterns can be used pattern used and still be within the scope of the present invention. For example, linear CFA patterns, FIG. 5, could be used to allow for easier (lower cost) CFA deposition and will allow for enhanced column (or row) signal processing to leverage various CCD and CMOS sensor read out architectures. Any variety of filter patterns can be used, but there should be equal amounts of pixels for each spectral band that is being filtered if it is desired to maintain the 50% sampling density over all the spectral image content.

The combination of dichroic filters and CFAs maximizes the spectral throughput. Dichroic beam splitters are highly efficient and little light is lost both in the reflection and passing through of light. In addition, CFAs can have high efficiencies. The loss of light through CFAs can be as low as 20%. As a result, with the 50% sampling for each band, almost 40% of spectral information can be captured.

After passing through the respective CFAs, the parsed beams of light will contact the image sensors. The image sensors have discrete photosites that allow it to capture the intensity of the light incident on each photosite. As the CFAs have filtered out the undesired spectra for each bandwidth, each photosite will capture the intensity of one spectral band. As a result, the output of the sensors is essentially two separate checkered maps corresponding to the different spectral bands.

Figure 6:
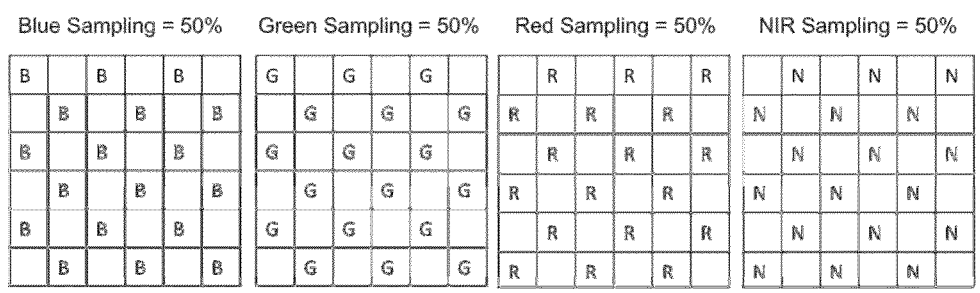
FIG. 6 depicts a view of the pixels sampled as a result of the CFA in accordance with one embodiment of the invention.

FIG. 6 depicts typical data results of the image sensors as separated by color. If the NIR sampling were superimposed over the green sampling, the full checkered pattern would be seen. As can be seen, each raw spectral data set has missing pixel information interspersed between the captured pixels in that spectral. The captured pixel information reflects the intensity of that spectral wavelength for that pixel and because of the high sampling density, missing pixels can be easily interpolated.

Figures 7, 8:
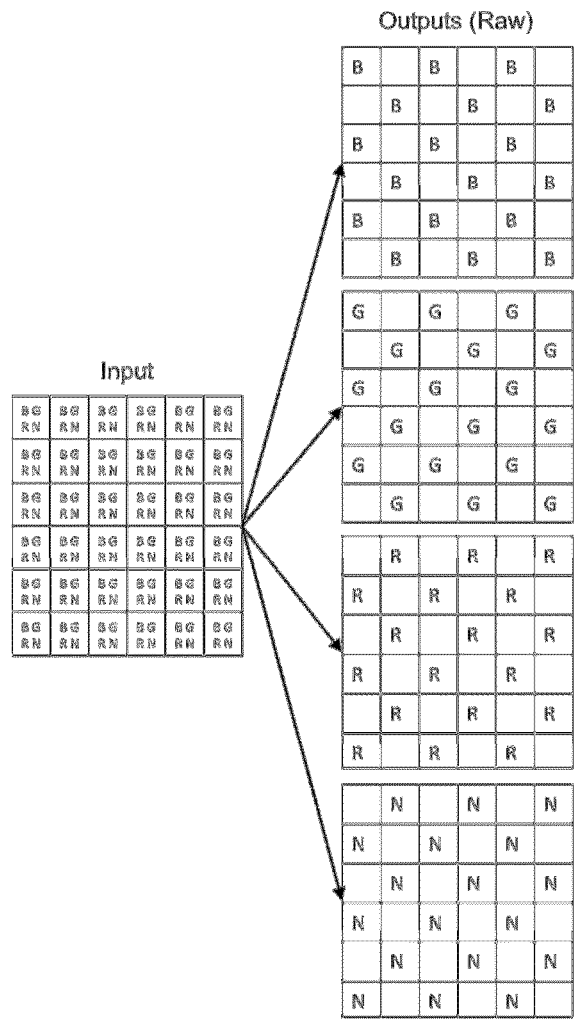
FIG. 7 depicts a view of the output data from the image sensors in accordance with one embodiment of the invention.
FIG. 8 depicts interpolation of color data for missing pixels in accordance with one embodiment of the invention.

As seen in FIG. 7, this pixel information is the output from the image sensors. This pixel information will be passed to the computer unit 12 to be processed by the processor. The first process will involve interpolation of the pixel information to fill in spectral information for the missing pixels. Based on the surrounding four pixel information, processor 14 will perform common interpolation techniques to fill in a value of the estimated intensity for that spectral bandwidth in the missing pixel. The high sampling density ensures the accuracy of this process.

Figures 9, 10:
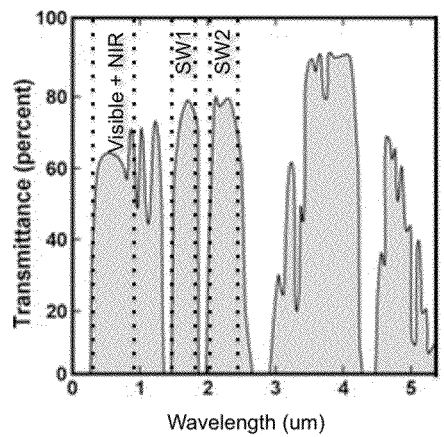
FIG. 9 depicts the data output after the interpolation process.
FIG. 10 depicts the spectral bands corresponding to the short wave IR.

FIG. 8 depicts this process whereby the values G1, G2, G3, and G4 are used to interpolate the value of G'. This process can be performed for all of the missing pixel data such that the checker board pattern can be filled out for each spectral bandwidth. This result is shown in FIG. 9.

Figure 15:
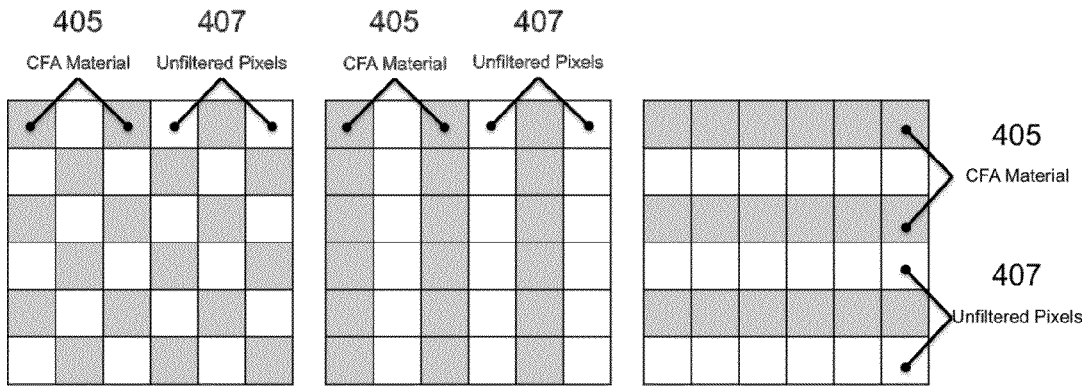
FIG. 15 depicts alternate views of the CFA patterns in accordance with another embodiment of the present invention.
Figure 16:
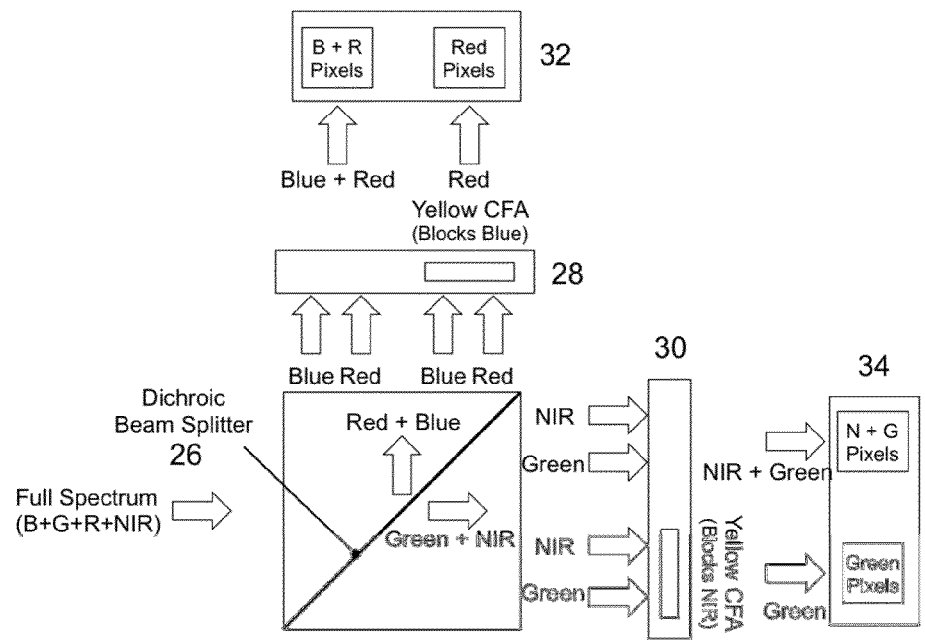
FIG. 16 depicts a plan view of the components of the camera component in accordance with another embodiment of the present invention.

In addition, to further enhance light sensitivity, it is possible to use a single color CFA pattern 405 combined with unfiltered pixels 407 as shown in FIG. 15. In this embodiment, shown in FIG. 16 the unfiltered pixels in Sensor 32 will collect both Blue and Red photons. Note that use of Yellow filters would result in the capture of Red values at Yellow photosites and Blue plus Red values at the monochrome photosites in Sensor 32. In this embodiment the filtered pixels will only collect Red photons. Using these Red pixel values, the missing Red Value from an unfiltered pixel can be interpolated and subtracted from its combined Red and Blue signal to determine the Blue value at that pixel. Green and NIR data can be determined and collected by applying the same process at Sensor 34.

Alternative single color CFA patterns may include those shown in FIG. 15 as well as others and are within the scope of the present invention. Other patterns that emphasize one of the spectral pair over the other can also be used such as a pattern where the ratio of pixels are for instance 2:1, 3:1 or even 4:1. For example, the green light can be filtered out less than the NiR light. The pattern used can vary and still be within the scope of the present invention.

As a result of the final interpolation process, full spectral information is achieved for all of the pixels corresponding to the image taken. Keeping the spectral information separate allows for important information to be gleaned from this information. The separate spectral information can be visually displayed on display 18 or the raw data can be further analyzed to produce useful information. For example, a visual graphical depiction of the blue spectral information can be used for coastal water mapping as it provides increased penetration of water bodies. It can also be used to differentiate soil and rock surfaces from vegetation.

The green spectral information, graphically displayed, can be used for assessment of vegetation vigor and is sensitive to water turbidity differences. It also can be used to separate vegetation (forest, croplands with standing crops) from soil in the image. In this spectral band, barren lands, urban areas and roads and highways have appeared as brighter (lighter) tone, but forests, vegetation, bare croplands, croplands with standing crops have appeared as dark (black) tone.

The red spectral information can be used to sense in a strong chlorophyll absorption region and strong reflectance region for most soils. In a graphical display, it has discriminated vegetation and soil. Forest land and water both have appeared as dark tone. This band has highlighted barren lands, urban areas, street pattern in the urban area and highways. It has also separated croplands with standing crops from bare croplands with stubble.

NIR spectral information operates to distinguish vegetation varieties and conditions. Because water is a strong absorber of near IR, this band has delineated water bodies (lakes and sinkholes), distinguished between dry and moist soils (barren land and croplands). In this band croplands and grasslands have showed higher reflectance (brighter tone) than the forest. This band has also separated croplands from bare croplands. Since standing crops (vegetation) has higher reflectance in the near IR region, they have appeared as brighter tone and due to presence of moisture content in the bare croplands which have appeared as darker tone. In the Near IR barren lands, urban areas and highways have not been highlighted and they appeared as dark tone. The Near IR is useful for crop identification and emphasizes soil-crop and land-water contrast.

In addition to information gleaned from the individual spectral bands, each spectral band can be combined with other spectral bands to provide unique information and subtle spectral-reflectance or color differences between surface materials that are often difficult to detect in a standard image. For example Water strongly absorbs infrared energy and weakly reflects red light. Water is the only common surface material with this spectral signal. Thus, the infrared/red ratio also has the effect of depicting all surface water bodies, regardless of water depth or turbidity. Calculation of spectral band ratios has proven quite useful for discrimination of surficial rocks and minerals. Examples of band ratio analysis include:

Near IR/Red: This ratio distinguished vegetation, water and croplands. It has enhanced forests, barren lands. Because forests or vegetation exhibits higher reflectance in near IR region (0.76-0.90 um) and strong absorption in red region (0.63-0.69 um) region. This ratio uniquely defines the distribution of vegetation. The lighter the tone, the greater the amount of vegetation present.

Red/Green: This ratio has separated forests and croplands. Because Red (0.63-0.69 um) is the red chlorophyll absorption band of healthy green vegetation and Green (0.52-0.60 um) is the reflectance band from leaf surfaces. This ratio can be useful to discriminate broad classes of vegetation. Croplands have appeared as lighter (brighter) tone and forests appeared as dark tone.

Bands can also be combined to enhance information content. Red-Green-Blue combination is the "natural color" band combination. Because the visible bands are used in this combination, ground features appear in colors similar to their appearance to the human visual system.

Green-Red-NIR band combination gives results similar to traditional color infrared aerial photography. Vegetation appears in shades of red, urban areas are cyan blue, and soils vary from dark to light browns. Ice, snow and clouds are white or light cyan. Coniferous trees will appear darker red than hardwoods. This is a very popular band combination and is useful for vegetation studies, monitoring drainage and soil patterns and various stages of crop growth. Generally, deep red hues indicate broad leaf and/or healthier vegetation while lighter reds signify grasslands or sparsely vegetated areas. Densely populated urban areas are shown in light blue.

Such analyses of the different combinations of spectral bands can be performed by processor 14 and any visual depictions created by the combination of different spectral bands can be displayed on the display in the computer unit.

A second embodiment of the present invention involves inclusion of short wave infrared (SWIR) spectral bands labeled SW1 and SW2 to the four bands Visible (RGB)+NIR image capture described above. FIG. 10 depicts the spectral band that corresponds to the SWIR spectral bands. As can be seen, the SW1 includes wavelengths from 1.55-1.75 um and the SW2 band includes wavelengths from 2.08-2.35 um.

Figure 11:
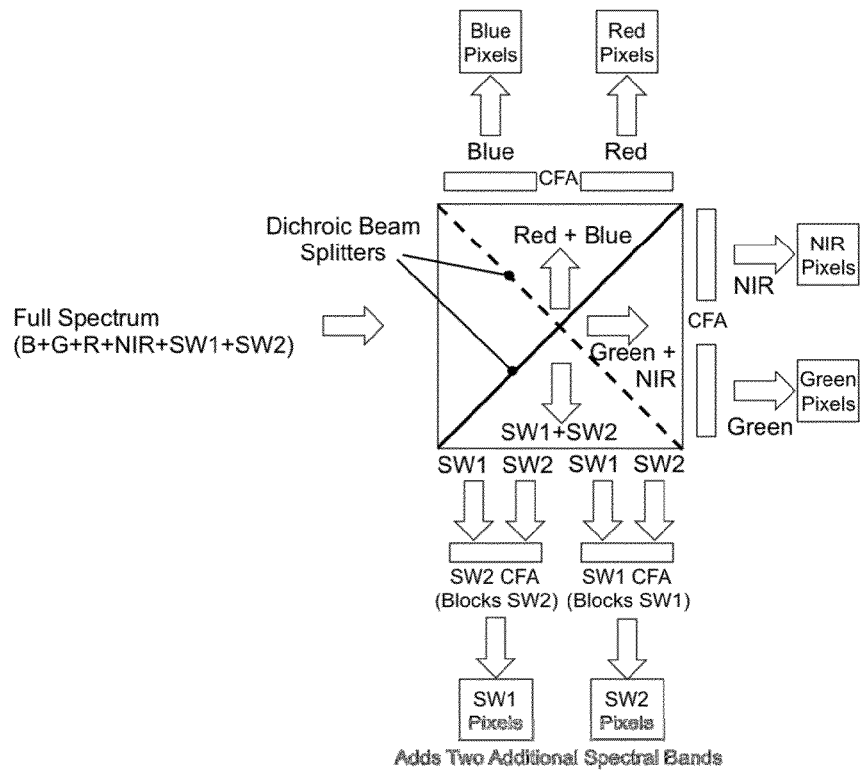
FIG. 11 depicts the depicts a plan view of the components of the camera components in accordance with another embodiment of the present invention.
Figure 12:
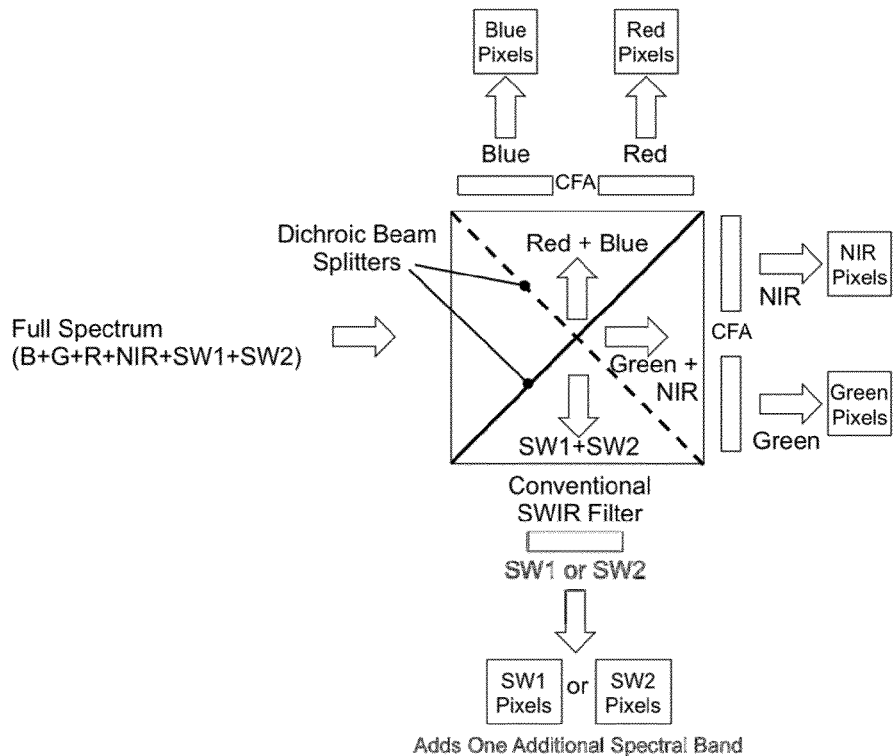
FIG. 12 depicts a plan view of the components of the camera components in accordance with another embodiment of the present invention.

FIG. 11 depicts an embodiment of the image sensor unit in accordance with this second embodiment. The configuration of the image sensor for the four channels is maintained; however an additional dichroic beam splitter is added to reflect the SW1 and SW2 spectra from the incident light. A conventional filter that transmits either SW1 or SW2 inserted in that reflected beam to filter out either the SW2 or SW1 light respectively. An alternate embodiment is shown in FIG. 12 wherein both SW1 and SW2 bands are filtered through a composite SWIR CFA with a checkerboard pattern in which case both SW1 and SW2 bands are captured. Other SWIR CFA patterns can be used and still be within the scope of the present invention.

Alternative sensor technology that includes elements photosensitive in the 1.5 to 2.4 um spectral band (also known as the Short Wave IR or SWIR band) is added to the four spectral band embodiment described above. The earth's atmospheric transmission windows for visible light through mid wave infrared are shown in FIG. 10. Additional short wave infrared (SWIR) spectral bands, specifically the spectral bands labeled SW1 and SW2 in FIG. 10 can be captured and added to the data sets acquired using the present invention.

Figure 13:
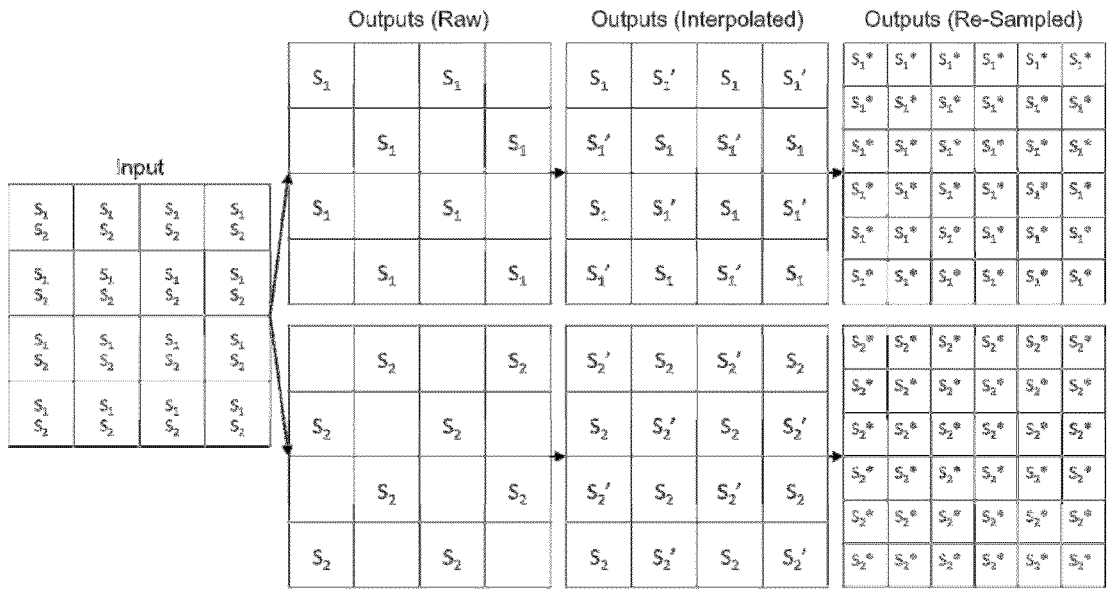
FIG. 13 depicts the output data from the image sensors in accordance with another embodiment of the present invention.
Figure 14:
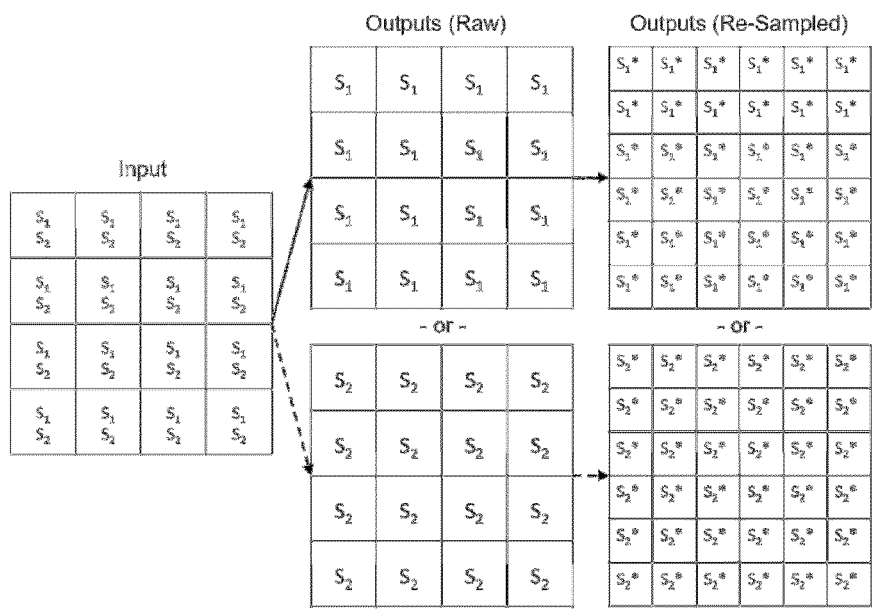
FIG. 14 depicts the output data from the image sensors in accordance with another embodiment of the present invention.

Due to significant physical differences in Visible/NIR image sensors and SWIR image sensors, the raw sampling ratio of the two will necessarily be different. The silicon sensor technology used to in CCD and CMOS image sensors do not respond to light in the SWIR spectrum. Therefore, other sensor materials must be used to capture the SWIR bands. The most mature technology available to function in this spectrum is Indium Gallium Arsenide (InGaAs). InGaAs sensors have larger pixel sizes (2-3×) and lower pixel counts relative to silicon CCD and CMOS sensors. As a result the raw SWIR image data has uniform coarse sampling; the final processed sampling ratios can maintain a 1:1 relationship to the Visible and NIR data by electronic resampling of the SWIR imagery as shown in FIG. 13 and FIG. 14.

In addition, capturing the SWIR bands may require relay and/or corrective optical elements between the beam splitter and SWIR spectrum sensing elements.

Similar to the result of the four channel embodiment described above, the SWIR image sensor will output data corresponding to the intensities of the SW1 or SW2 bands for each pixel. This result is shown in FIG. 13 and FIG. 14.

With this additional spectral information, additional information regarding the image can be gleaned. Information content in the individual SW1 and SW2 bands include:

SW1 (1.55-1.75 um): is sensitive to the turgidity or amount of water in plants. SW1 has separated forest lands, croplands, water body distinctly. Forests have appeared as comparatively darker tone than the croplands (light gray). SW1 has separated water body (dark tone) from barren lands, croplands, and grass lands (lighter tone).

SW2 (2.08-2.35 um): has separated land and water sharply. SW2 has strong water absorption region and strong reflectance region for soil and rock. Urban area, croplands, highways, bare croplands have appeared as bright tone and water body, forest have appeared as dark tone.

Band ratio analysis is also applicable for the SW1 and SW2 spectral bands. In particular, the SW1/SW2 ratio separated land and water uniquely. Since soils exhibit strong absorption in the SW2 (2.08-2.35 um) and high reflectance in SW1 (1.55-1.75 um), soil has been enhanced in this ratio. Land has appeared as lighter tone and water appeared as dark tone. It has also enhanced presence of moisture in croplands. Both SW1 and SW2 are sensitive to moisture content variation in soils and vegetation. This ratio is useful for crop-drought studies and plant vigor investigations.

The ratio of NIR/SW1 enhances the water body, vegetation and presence of moisture content in the croplands. Water body has appeared as dark tone and vegetation as lighter tone because water is a strong absorber in NIR region and higher reflectance in SW1 region. It can be useful for discriminating water bodies from land.

The ratio of Red/SW1 enhances barren lands, highways, street patterns within the urban areas and urban built-up or cemented areas. It could not enhance the clear water but it enhanced turbid water. This ratio is useful for observing differences in water turbidity. Barren lands, highways, urban and built-up areas have appeared as lighter tone and forests, water body and croplands appeared as dark tone.

Beyond band ratio analysis, band combination can be applied using the SWIR bands can also yield considerable information content enhancement. Band combination occurs when one maps any three spectral bands into RGB space so that the human eye can perceive the resulting image.

The combination of SW2, NIR and Green band information provides a "natural-like" rendition, while also penetrating atmospheric particles and smoke. Healthy vegetation will be a bright green and can saturate in seasons of heavy growth, grasslands will appear green, pink areas represent barren soil, oranges and browns represent sparsely vegetated areas. Dry vegetation will be orange and water will be blue. Sands, soils and minerals are highlighted in a multitude of colors. This band combination provides striking imagery for desert regions. It is useful for geological, agricultural and wetland studies. If there were any fires in this image they would appear red. This combination is used in the fire management applications for post-fire analysis of burned and non burned forested areas. Urban areas appear in varying shades of magenta. Grasslands appear as light green. The light-green spots inside the city indicate grassy land cover—parks, cemeteries, golf courses. Olive-green to bright-green hues normally indicate forested areas with coniferous forest being darker green than deciduous The combination of NIR, SW1 and Blue allows healthy vegetation to appear in shades of reds, browns, oranges and yellows. Soils may be in greens and browns, urban features are white, cyan and gray, bright blue areas represent recently clear cut areas and reddish areas show new vegetation growth, probably sparse grasslands. Clear, deep water will be very dark in this combination, if the water is shallow or contains sediments it would appear as shades of lighter blue. For vegetation studies, the addition of the Mid-IR band increases sensitivity of detecting various stages of plant growth or stress; however care must be taken in interpretation if acquisition closely follows precipitation. Use of NIR and SW1 shows high reflectance in healthy vegetated areas. It is helpful to compare flooded areas and red vegetated areas with the corresponding colors in the Red-Green-Blue combination to assure correct interpretation.

The combination of NIR, SW1 and Red offers added definition of land-water boundaries and highlights subtle details not readily apparent in the visible bands alone. Inland lakes and streams can be located with greater precision when more infrared bands are used. With this band combination, vegetation type and condition show as variations of hues (browns, greens and oranges), as well as in tone. This combination demonstrates moisture differences and is useful for analysis of soil and vegetation conditions. Generally, the wetter the soil, the darker it appears, because of the infrared absorption capabilities of water.

The combination of SW2, SW1 and Red also provides a "natural-like" rendition while also penetrating atmospheric particles, smoke and haze. Vegetation appears in shades of dark and light green during the growing season, urban features are white, gray, cyan or purple, sands, soils and minerals appear in a variety of colors. The almost complete absorption of SW bands in water, ice and snow provides well defined coast lines and highlighted sources of water within the image. Snow and ice appear as dark blue, water is black or dark blue. Hot surfaces such as forest fires and volcano calderas saturate the SW bands and appear in shades of red or yellow. One particular application for this combination is monitoring forest fires. Flooded areas should look very dark blue or black, compared with the Red-Green-Blue combination in which shallow flooded regions appear gray and are difficult to distinguish.

What is claimed is:

1. A camera system to capture an image comprising:
   a first beam splitter, said first splitter being positioned to intercept a beam of electromagnetic radiation corresponding to the captured image and split the beam into a first beam and a second beam; the first beam comprising of radiation of two different spectral bands; the second beam comprising of radiation of two different spectral bands; the spectral bands of the first beam each being different from the spectral bands of the second beam;
   a first filter, said first filter being positioned to intercept the first beam; said first filter comprising of a first filter material and a second filter material; said first filter material allowing radiation that corresponds to one of the two different spectral bands in the first beam to pass through; said second filter material allowing radiation that corresponds to the other of the two spectral bands in the first beam to pass through;
   a second filter, said second filter being positioned to intercept the second beam; said second filter comprising of a third filter material and a fourth filter material; said third filter material allowing radiation that corresponds to one of the two different spectral bands in the second beam to pass through; said fourth filter material allowing radiation that corresponds to the other of the two spectral bands in the second beam to pass through; and
   a first image sensor and a second image sensor, each image sensor being positioned to intercept the first beam and second beam after said first and second beams pass through the first and second filters; said first and second filters measuring the intensity of the radiation for the four spectral bands in the first and second beams.

2. The camera system as recited in claim 1, wherein said spectral bands in the first beam and the second beam are red light, blue light, green light and near infrared light.

3. The camera system as recited in claim 1, wherein the amount of said first filter material is approximately equal to the amount of said second filter material in the first filter.

4. The camera system as recited in claim 1, wherein said first filter material and said second filter material are arranged in said first filter in a checkerboard pattern.

5. The camera system as recited in claim 1, further comprising of a processor; wherein each of said image sensors will output the measured intensity data to said processor; said processor being capable of interpolating said measured intensity data to calculate additional intensity data for each of the spectral bands.

6. The camera system as recited in claim 1, further comprising a display that will display a graphical image based on the measured intensity data.

7. The camera system as recited in claim 6, wherein said the graphical image is based on the measured intensity data for one spectral band.

8. The camera system as recited in claim 6, wherein the graphical image is based on the measured intensity data for four spectral bands.

9. The camera system as recited in claim 3, wherein the amount of the first filter material, the second filter material, the third filter material and the fourth filter are approximately equal to each other in the first and second filters.

10. The camera system as recited in claim 5 wherein the processor calculates ratios of intensities between different spectral bands and displays the calculations on a display.

11. A camera system to capture a image comprising:
a housing; said housing designed to allow a beam of electromagnetic radiation corresponding to the captured image to enter said housing;
a first beam splitter situated in said housing such that the beam of electromagnetic radiation entering said housing will pass through the splitter; said first beam splitter splitting said electromagnetic radiation and causing a first spectral beam to be directed in a first direction and a second spectral beam to be directed in a second direction; said first and second directions being different from each other;
a first filter situated in said housing such that the first spectral beam will pass through and be filtered by said first filter; said first filter having a first portion allowing radiation of a first filtered spectral band to pass through while filtering out other spectral bands and having a second portion allowing a second filtered spectral band to pass through while filtering out other spectral bands;
a second filter situated in said housing such that the second spectral beam will pass through and be filtered by said second filter; said second filter having a third portion allowing radiation of a third filtered spectral band to pass through while filtering out other spectral bands and having a fourth portion allowing a fourth filtered spectral band to pass through while filtering out other spectral bands; wherein the first portion, the second portion, the third portion and the fourth portion are approximately the same size in the first and second filters;
a first image sensor unit situated in said housing to intercept the first spectral beam after passing through said first filter; said first image sensor unit comprising of a first sensor that will measure the intensity of the radiation for said first and second spectral bands from the first spectral beam; and
a second image sensor unit situated in said housing to intercept the second spectral beam after passing through said second filter; said second image sensor unit comprising of a second sensor that will measure the intensity of the radiation for said third and fourth spectral bands from the second spectral beam.

12. The camera system as recited in claim 11, wherein said first, second, third and fourth filtered spectral bands are red light, blue light, green light and near infrared light.

13. The camera system as recited in claim 11, wherein said first filtered spectral band comprises of radiation of a first selected spectral band selected from a group consisting of red light, blue light, green light and near infrared light; said second filtered spectral band comprises of radiation of a second selected spectral band and a third selected spectral bands; said second and third selected spectral bands selected from a group consisting of red light, blue light, green light and near infrared light; wherein said second selected spectral bands is the same as said first selected spectral band; and wherein said first sensor unit further comprises of a processor that will interpolate intensity data for said third selected spectral band based on the measurements of intensity of the radiation composed of the first filtered spectral band and the second filtered spectral band.

14. The camera system as recited in claim 11, further comprising
a second beam splitter; said second splitter being positioned to intercept the beam of electromagnetic radiation and create a third beam directed in a third direction;
a third filter situated in said housing such that the third spectral beam will pass through and be filtered by said third filter; said third filter allowing radiation of a fifth filtered spectral band to pass through while filtering out other spectral bands; said fifth spectral band being different from said first, second, third and fourth filtered spectral bands; and
a third image sensor situated in said housing to intercept the third spectral beam after passing through said third filter so that the third image sensor can measure the intensity of the radiation for said fifth filtered spectral band.

15. The camera system as recited in claim 14, wherein the third filter will allow radiation of a sixth filtered spectral band to pass though while filtering out other spectral bands; said sixth spectral band being different from said first, second, third, fourth and fifth spectral bands and the third image sensor will measure the intensity of the sixth spectral band.

16. The camera system as recited in claim 15 wherein the fifth and sixth filtered spectral bands are short wave infrared bands.

17. The camera system as recited in claim 15 wherein the third filter will allow approximately equal amounts of radiation for the fifth and sixth filtered spectral bands to pass through as the amounts of radiation for the first, second, third and fourth spectral bands.

18. The camera system as recited in claim 16 wherein a graphical image of the visual image will be displayed on a display based on the measured intensity of the spectral bands.

19. The camera system as recited in claim 16 wherein a ratio of the measured intensity between spectral bands will be calculated by a processor and the calculations displayed on a display.

20. A camera system to capture a visual image comprising:
a housing; said housing allowing a first beam of light to enter the housing; the beam of light representing the visual image to be captured;
a dichroic beam splitter placed in the path of the beam of light to split the beam of light into a second beam and a third beam of light; said second beam comprised of light of red light and blue light; said third beam comprised of green light and near infrared light;
a first filter placed in the path of the second beam; wherein said first filter is comprised of an array of a first and second filter elements; said first filter element allowing red light to pass through it; said second filter element allowing blue light to pass through it; said first and second filter elements arranged in a checkerboard pattern in said first filter to cover approximately equal amounts of space in said filter;
a second filter placed in the path of the third beam; wherein said second filter is comprised of an array of a third and fourth filter elements; said third filter element allowing green light to pass through it; said fourth filter element allowing near infrared light to pass through it; said third and fourth filter elements arranged in a checkerboard pattern in said second filter to cover approximately equal amounts of space in said second filter;
a first and second image sensor placed in the path of the second and third beams to measure the intensities of the red, blue, green and near infrared lights.

* * * * *